(12) United States Patent
Lawandy

(10) Patent No.: US 9,839,947 B2
(45) Date of Patent: Dec. 12, 2017

(54) SYSTEM FOR CLEANING PHOTO CATALYTIC BANKNOTES

(71) Applicant: Nabil M. Lawandy, Saunderstown, RI (US)

(72) Inventor: Nabil M. Lawandy, Saunderstown, RI (US)

(73) Assignee: SPECTRA SYSTEMS CORPORATION, Providence, RI (US)

( * ) Notice: Subject to any disclaimer, the term of this patent is extended or adjusted under 35 U.S.C. 154(b) by 0 days.

(21) Appl. No.: 14/968,142

(22) Filed: Dec. 14, 2015

(65) Prior Publication Data

US 2016/0107204 A1  Apr. 21, 2016

Related U.S. Application Data

(62) Division of application No. 13/625,368, filed on Sep. 24, 2012.

(51) Int. Cl.
*B08B 7/00* (2006.01)
*B01J 21/06* (2006.01)
(Continued)

(52) U.S. Cl.
CPC .......... *B08B 7/0057* (2013.01); *B01J 21/063* (2013.01); *B01J 35/004* (2013.01); *B01J 35/0013* (2013.01); *B42D 25/29* (2014.10); *B42D 25/387* (2014.10); *D21H 21/14* (2013.01); *D21H 21/36* (2013.01); *D21H 21/40* (2013.01); *G06Q 10/0875* (2013.01); *B42D 2033/14* (2013.01); *B82Y 30/00* (2013.01); *Y10S 977/773* (2013.01); *Y10S 977/811* (2013.01)

(58) Field of Classification Search
CPC ............ G07D 11/0084; G07D 11/0081; G07F 19/20; C04B 41/5041; G06Q 40/00
USPC .... 134/56 R, 42, 1, 26, 40, 15, 34; 194/206, 194/207, 200, 212; 382/135, 137, 139, 382/140, 312; 209/534
See application file for complete search history.

(56) References Cited

U.S. PATENT DOCUMENTS 2,922,893 A * 1/1960 Ett ........................... G07D 7/00
                                                              194/207
4,449,050 A * 5/1984 Kamhi ............... G07D 11/0003
                                                              134/122 R
(Continued)

*Primary Examiner* — Michael Barr
*Assistant Examiner* — Thomas Bucci
(74) *Attorney, Agent, or Firm* — Barlow, Josephs & Holmes, Ltd.

(57) ABSTRACT

Self-cleaning banknotes are provided using coatings, inks and additives which are photo-active and catalytic to reactions which are effective in breaking up organic contaminants or dirt to allow for the self-cleaning of banknotes by ambient light exposure as well as the cleaning of processed banknotes using equipment with more intense optical excitation, thus increasing their usable life. The invention is usable with all substrates and particularly polymeric substrates such as biaxially-oriented polypropylene (BOPP). The invention further discloses a system which allows a certain class of fitness parameters to cause these banknotes to be redirected to a cleaning module, be revaluated, and then either returned to circulation or rejected and/or destroyed. In addition, inks which are photo-catalytic can be used for extending the life of the banknotes in printed regions.

9 Claims, 3 Drawing Sheets

(51) Int. Cl.
*B42D 25/29* (2014.01)
*B01J 35/00* (2006.01)
*D21H 21/36* (2006.01)
*B42D 25/387* (2014.01)
*D21H 21/14* (2006.01)
*G06Q 10/08* (2012.01)
*D21H 21/40* (2006.01)
*B82Y 30/00* (2011.01)

(56) References Cited

U.S. PATENT DOCUMENTS

| | | | | |
|---|---|---|---|---|
| 4,653,647 A * | 3/1987 | Hashimoto | | G06F 7/06 209/534 |
| 4,723,072 A * | 2/1988 | Naruse | | G07D 7/12 209/534 |
| 4,972,958 A * | 11/1990 | Ito | | G07D 11/0081 209/534 |
| 5,055,834 A * | 10/1991 | Chiba | | G07D 7/12 340/5.86 |
| 5,247,159 A * | 9/1993 | Yuge | | G07D 11/0075 209/534 |
| 5,374,814 A * | 12/1994 | Kako | | A61L 2/04 209/534 |
| 5,626,821 A * | 5/1997 | Kako | | A61L 2/04 134/122 R |
| 5,626,822 A * | 5/1997 | Kadowaki | | A61L 2/04 134/122 R |
| 6,101,266 A * | 8/2000 | Laskowski | | G07D 7/12 382/135 |
| 6,290,070 B1 * | 9/2001 | Graef | | B65H 3/047 209/534 |
| 6,731,785 B1 * | 5/2004 | Mennie | | G07D 7/12 209/534 |
| 6,797,974 B2 * | 9/2004 | Philipp | | G07D 7/121 250/556 |
| 6,978,926 B2 * | 12/2005 | Kobayashi | | G07D 11/0054 235/379 |
| 7,014,105 B2 * | 3/2006 | Fujioka | | G07D 11/0036 235/379 |
| 7,359,543 B2 * | 4/2008 | Tsuji | | G07D 7/18 194/207 |
| 7,397,041 B1 * | 7/2008 | Leonard | | A61L 2/10 250/453.11 |
| 8,047,426 B2 * | 11/2011 | Haycock | | G07D 7/00 235/379 |
| 8,756,158 B2 * | 6/2014 | Colvin | | G06Q 40/00 705/39 |
| 2003/0168308 A1 * | 9/2003 | Maier | | G07D 7/122 194/207 |
| 2003/0234362 A1 * | 12/2003 | Thierauf | | G07D 7/18 250/341.6 |
| 2007/0122023 A1 * | 5/2007 | Jenrick | | G07D 7/162 382/135 |
| 2008/0053308 A1 * | 3/2008 | Marzolin | | B01D 53/8668 95/274 |
| 2008/0067031 A1 * | 3/2008 | Lin | | G07D 11/0042 194/207 |
| 2010/0032351 A1 * | 2/2010 | Schmidt | | G07D 11/0078 209/534 |
| 2010/0032352 A1 * | 2/2010 | Ozaki | | G07D 11/0084 209/534 |
| 2010/0102234 A1 * | 4/2010 | Hamasaki | | G07D 7/121 250/341.7 |
| 2010/0127070 A1 * | 5/2010 | Sanders | | G07F 19/202 235/379 |
| 2010/0128965 A1 * | 5/2010 | Blair | | G06K 9/2018 382/135 |
| 2011/0200656 A1 * | 8/2011 | Olsson | | B42D 25/29 424/405 |

* cited by examiner

SYSTEM FOR CLEANING PHOTO CATALYTIC BANKNOTES

CROSS-REFERENCE TO RELATED APPLICATIONS

This application is related to and claims priority from earlier filed U.S. patent application Ser. No. 13/625,368, filed Sep. 24, 2012.

BACKGROUND OF THE INVENTION

The present invention relates generally to substrate materials that include a self-cleaning feature. More specifically, the present invention relates to a substrate that includes a photo-catalytic material therein that, upon exposure to a source of illumination, reacts in a manner that causes the paper, or in general, the substrate material to shed accumulated contaminants and dirt. The process is also effective in disinfection of the banknotes.

High security documents such as banknotes are generally formed on substrate materials that are frequently equipped with security elements that are difficult to imitate and permit even a layman to check the authenticity of the print or the document. Such security elements can be for example windowed security threads which are visible in certain areas on the surface of the paper of value, applied foils which have a transparent or metallized embossed hologram, blind embossings, so-called "latent images" produced by printing technology or by printing and embossing technology which render different information from different viewing angles, prints containing optically variable pigments and producing different color effects depending on the viewing angles, or prints comprising metallic effect ink which have metallic luster for example in a gold, silver or bronze tone. In addition to these unaided features, there are quasi-public security threads, fibers and inks which fluoresce or phosphoresce under illumination with UV or IR sources.

As counterfeiters have become more sophisticated, the security features in such documents have had to become more advanced as well in order to prevent widespread fraud. As such substrates have become more advanced, their cost to produce has also gotten much higher and therefore making the replacement of worn currency quite expensive. Therefore it is important that in addition to being secure, such substrates must have a high level of durability.

Banknotes have a finite time in circulation due to soling and tearing of the notes in use by the public. Banknotes are handled in many ways during their usable life and experience a variety of mechanical stresses as well as coming into contact with substances that can dirty the notes, making them hard to authenticate and use. One of the major determinants of the banknote life, which is shortest for the lowest denominations, is soiling. Work by the Dutch National Bank has shown that the primary source of soiling is sebum from contact with fingers and which eventually oxidizes and becomes yellow. As a result, durability must be balanced with the other important components of value documents, such as banknotes, is their flat substrate which typically consists predominantly of cotton and cotton-denim mixtures and pulp papers whose typical haptics is also influenced by the one-sided or two-sided calendaring during steel engraving. The haptic character of a bank note is manifested mainly by its feel and its flexural stiffness; it furthermore has a characteristic sound when being deformed and creased.

In order to improve durability of these substrates, it is known to provide papers of value with a dirt-repellent protective layer to extend the life time and fitness for circulation. Such a protective layer typically contains cellulose ester or cellulose ether for the greater part and micronized wax for a lesser part and which is applied to the bank notes all over. The micronized wax is dispersed by kneading or mixing with oil, an ink binder or a mixture thereof. The sheets freshly printed with the protective layer can be stacked without difficulties without any black ink from one sheet staining the sheet therebelow Another coating composition containing only a binder and no fillers is applied to the banknote paper, which has a large surface area or high surface roughness due to its porosity. The composition is applied in a layer thickness such that a smooth surface and thus little possibility for dirt deposit results. Further, the coating is thin enough not to impair the other stated properties of the paper.

The problem is that known protective layers do not last or wear well. Conventional protective layers comprising water-based lacquers usually fail to completely meet a demanding requirement profile. For example, very good dirt repellence and adhesion quality go against resistance to the penetration of liquid, and vice versa. Water-based lacquers therefore currently meet the high requirements for a protective layer in security printing and in particular bank-note printing only if a second component in the form of a crosslinking agent is added.

The problem is that central banks need to replace worn and soiled notes at a cost to taxpayers. In the USA, typically, the volume of notes manufactured is in the billions of notes per year (4-6 billion typically). The production of banknotes is costly and particularly so for the higher denominations which have many security features, both for the public as well as machine readable by bill acceptors and the central banks using high speed sorters. Banknote sorters made by Geiseke and Devrient, De La Rue International and Toshiba typically process banknotes at rates of 10-40 banknotes/second and perform a number of diagnostics using sensors in the note path. Theses sensors are a combination of authentication sensors as well as note fitness sensors. The fitness sensors primarily use imaging and analysis of the images to determine if the banknote should be destroyed or returned into circulation.

The cost of replacing banknotes has led to the development of polymeric substrates such as biaxially oriented polypropylene (BOPP) as well as composite substrates of polymer and paper. These substrates have begun to replace paper banknotes as they claim to have more durability and soil resistance and hence save the central bank money by replacing fewer unfit banknotes every year.

There is a need therefore for a substrate material that provides high security against fraud while exhibiting increased durability and self-cleaning characteristics. Further there is a need for a substrate that through the use of coatings, inks and additives that are photo-active and catalytic to reactions which are effective in breaking up organic contaminants or dirt. There is still a further need for a system that using a certain class of fitness parameters causes identified banknotes to be redirected to a cleaning module prior to re-evaluation and then a determination that they are either returned to circulation or destroyed.

BRIEF SUMMARY OF THE INVENTION

In this regard, the present invention provides for substrate materials that include a self-cleaning and directed cleaning capability. More specifically, the present invention provides a substrate that includes a photo-catalytic material therein that, upon exposure to a source of illumination, reacts in a manner that causes the substrate and printing inks materials, to shed accumulated contaminants and dirt and a system for sorting, cleaning and analyzing banknotes formed using such a substrate material.

In general the present invention employs coatings, inks and additives which are photo-active and catalytic to reactions which are effective in breaking up organic contaminants or dirt. In some cases, photo-excitation of these materials also leads to interfaces which are super-hydrophilic allowing for more water to be split, producing more reactive OH radicals by the photo-catalytic materials and in turn breaking more organic contaminant bonds for eventual removal of the adhered materials (oxidized sebum and other contaminants). Such an effect desirably occurs through exposure to ambient light. The self-cleaning materials incorporated in banknotes can be additionally utilized beyond ambient light exposure using equipment with optical/UV excitation and flowing air, water flow, and mechanical brushes, thus removing soiling and increasing the usable life of banknotes.

The invention is usable with all substrates and particularly polymeric substrates such as biaxially-oriented polypropylene (BOPP). The invention further discloses a system which allows a certain class of fitness parameters to cause these banknotes to be redirected to a cleaning module, be revaluated, and then either returned to circulation or destroyed. In addition, inks which are photo-catalytic can be used for extending the life of the banknotes in printed regions.

It is therefore an object of the present invention to provide a substrate material that provides high security against fraud while exhibiting increased durability and self-cleaning characteristics. It is a further object of the present invention to provide a substrate that through the use of coatings, inks and additives that are photo-active and catalytic to reactions which are effective in breaking up organic contaminants or dirt can be altered by light to allow for the self-cleaning of banknotes by ambient light exposure as well as the cleaning of processed banknotes using equipment with optical excitation, thus increasing their usable life. It is still a further object of the present invention to provide a system that using a certain class of fitness parameters causes identified banknotes to be redirected to a cleaning module prior to reevaluation and then a determination that they are either returned to circulation or destroyed.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
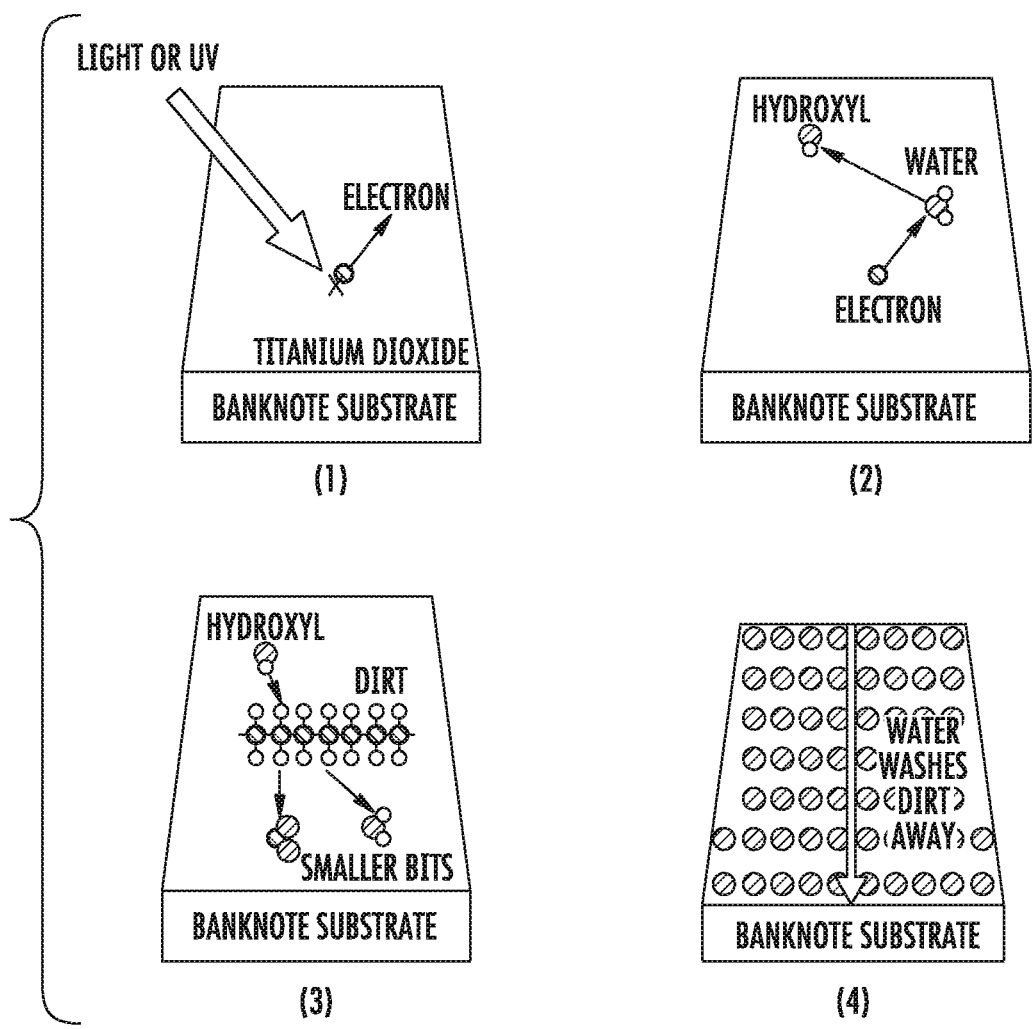
FIG. 1 is a diagram of the present invention as applied to a banknote.

Now referring to the drawings, there is disclosed a substrate material that is formed to include a self-cleaning feature. More specifically, the present invention provides a substrate or coating for a substrate that includes a photocatalytic material therein when, upon exposure to a source of illumination, reacts in a manner that causes the substrate material to shed accumulated contaminants and dirt. Further, the present invention discloses a system for sorting, cleaning and analyzing banknotes that are formed using such a substrate material.

In the most general sense, the present invention employs coatings, inks and/or additives that are photo-active. The photo-active nature of these materials allows for the self-cleaning of substrates, such as for example banknotes, by ambient light exposure as well as the cleaning of processed banknotes using equipment with optical excitation, thus increasing their usable life. The invention is usable with all substrates and particularly polymeric substrates such as biaxially-oriented polypropylene (BOPP).

It is known that semiconductor nanoparticles exhibit various photo-catalytic effects. Examples of these include III-V (GaN, GaAs) and II-VI (ZnS, ZnSe, CdS, CdSe, $WS_2$, $MoS_2$) semiconductors and various metal oxides such as ZnO, $TiO_2$, $MoO_3$, $CeO_2$, $ZrO_2$, $WO_3$, alpha-$FeO_3$ and $SnO_2$. $TiO_2$ (titanium dioxide) is of particular importance for this application as it is white in color and inexpensive. Its low cost and availability have been a large factor in its increased use in many areas including Dye Sensitized Solar Cells (DSSC), selective oxidation, disinfection and metal corrosion prevention Not all forms of $TiO_2$ are highly photo-catalytic. The most photo-reactive form is the anatase phase which can be obtained by high temperature conversion. It is of particular note that the anatase form of $TiO_2$ can be excited by ultraviolet energy having a wavelength in the 200 nm-400 nm region and more particularly in the 360 nm-390 nm region. This is advantageous in that light sources such as low cost LED flash lamps, arc sources and lasers are all available for excitation in this energy range and are thus anticipated for possible use within the scope of the present invention. Further, those metal oxides and semi-conductors listed above are equally applicable and intended to fall within the scope of the present invention as being suitable photocatalytic materials within the scope of the present invention. In addition, modified $TiO_2$ can be used which has different absorption, interfacial charge transfer and absorption characteristics.

Photo-catalytic degradation with illuminated $TiO_2$ of a large number of substrates including soot and carbonaceous contaminants is primarily ascribed to the strong oxidation potential of its valence band holes and surface OH radicals. In some cases, direct electron transfer from the conduction band to $O_2$ leads to degradation through $O^-_2$ reactions. In one embodiment, as shown at FIG. 1, when excitation energy such as ambient lighting is directed onto the photocatalytic materials, electrons and holes can be generated and transferred to $O_2$ and OH respectively (1). More particularly, when a stronger effect is desired, ultraviolet energy is directed onto the anatase titanium dioxide, more electrons and holes can be generated and transferred. In either case, these charge transfers convert water molecules from the ambient air into hydroxyl radicals (2) that in turn cause chemical oxidation and reduction reactions take place (3). In this specific example, at the anatase titanium dioxide or in general the semiconductor particle surface. In effect, the hydroxyl radicals attack organic (carbon-based) dirt molecules and break them up into smaller fragments that are much easier to remove (4). In this regard, the present invention employs photo-catalytic semiconductor materials or photo-catalytic metal oxides as an additive to a banknote either as a coating, ink used for printing of the banknote or within the substrate itself. In a more specific embodiment, the present invention employs anatase titanium dioxide as an additive to a banknote either as a coating, ink used for printing of the banknote or as the substrate itself. Since the reactions happen at the anatase titanium dioxide material, preferably positioned on the very surface of the banknote, they attack the lowest layers of the dirt, loosening encrusted dirt particles very effectively by chipping them away from the inside out. This is in clear contrast to normal cleaning, where the dirt is scrubbed from the outside in.

Figure 2:
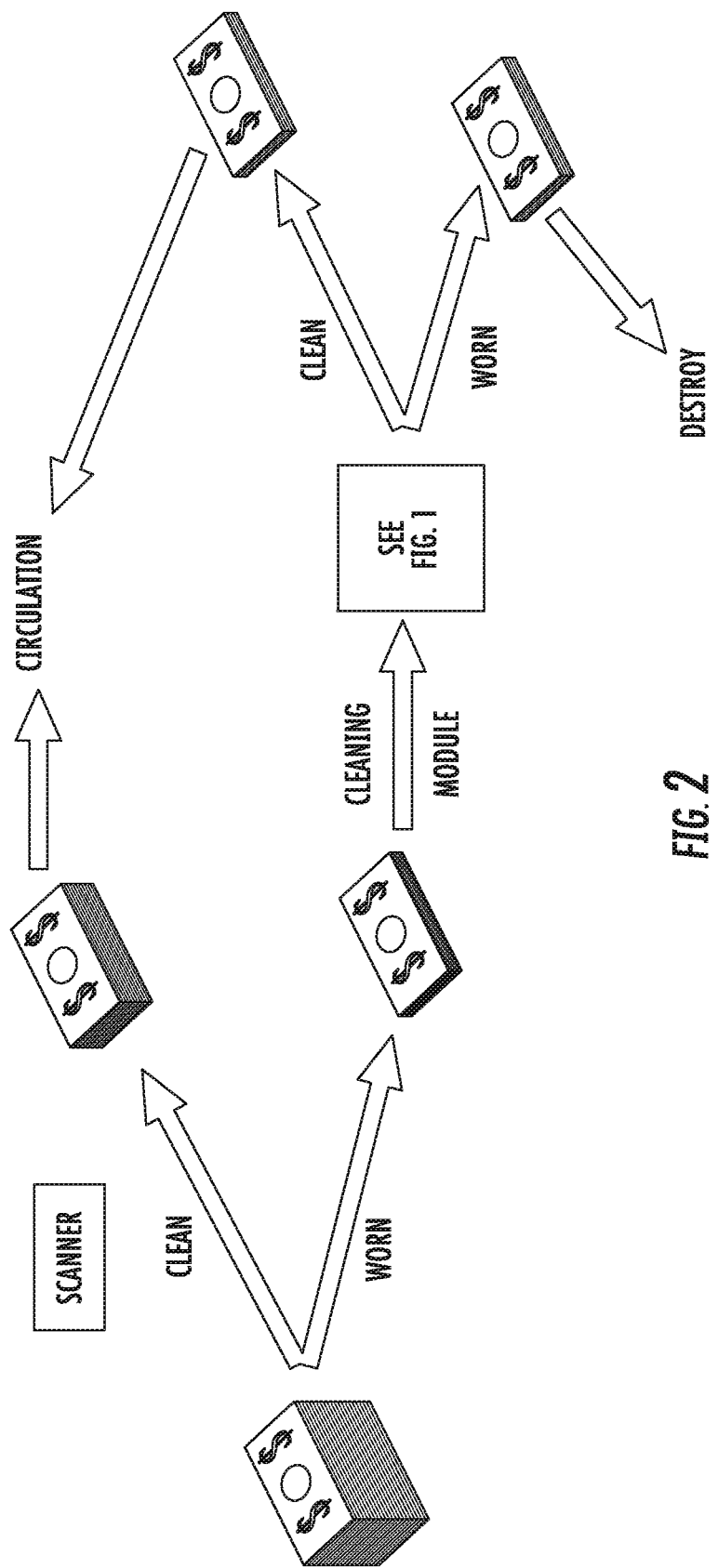
FIG. 2 is a schematic diagram of system for cleaning and analyzing a banknote in accordance with the present invention.
Figure 3:
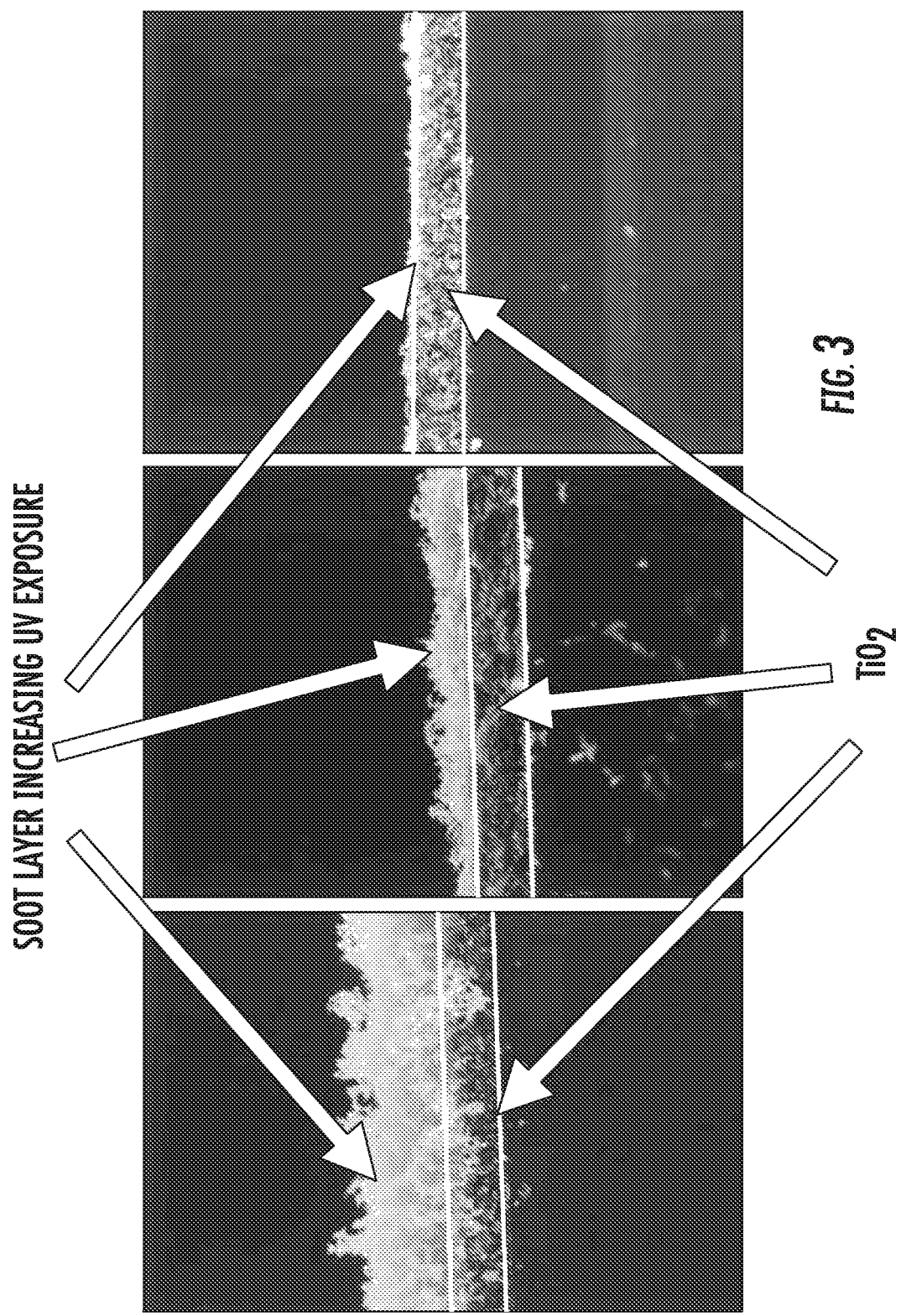
FIG. 3 is an enlarged cross-section depicting the result of cleaning a banknote in accordance with the present invention.

The invention further discloses a system at FIG. 2 for evaluating the status and fitness of a banknote in order to determine whether it should remain in circulation. The system may be a standalone system or incorporated onto banknote counters and sorters. As the banknotes pass through the system, the system employs a sensor to read various fitness data from the banknote. Based on the date the system makes a decision to either pass or clean the banknote. When the banknote is routed to the cleaning process, a cleaning module applies energization light for to initiate the photo-catalytic process and removes the photo-catalytic reaction products using a wash, gas jet, or mechanical means. Once the banknote is cleaned, it is re-evaluated using a fitness sensor that either returns the note to circulation or sends the banknote to a destroyer device or reject sorter bin.

It is therefore an object of the present invention to provide a substrate material that provides high security against fraud while exhibiting increased durability and self-cleaning characteristics. It is a further object of the present invention to provide a substrate that through the use of coatings, inks and additives that are photo-active and catalytic to reactions which are effective in breaking up organic contaminants or dirt to allow for the self-cleaning of banknotes by ambient light exposure as well as the cleaning of processed banknotes using equipment with optical excitation, thus increasing their usable life. It is still a further object of the present invention to provide a system that using a certain class of fitness parameters causes identified banknotes to be redirected to a cleaning module prior to reevaluation and then a determination that they are either returned to circulation or destroyed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for cleaning a substrate material comprising:
    scanning said substrate to determine fitness data relating thereto said substrate having a photocatalytic material on or about said substrate;
    making a decision based on said fitness data to clean the substrate;
    applying excitation energy having a wavelength in the 200 nm-400 nm region to excite said photo-catalytic material and initiate photo-catalysis oxidizing contaminants at the surface of the substrate thereby loosening all encrusted material;
    washing said loosened material; and
    rescanning said substrate to determine whether to return the substrate to circulation or to reject or destroy the substrate.

2. The method of claim 1, wherein said substrate is a banknote.

3. The method of claim 1, wherein said photo-catalytic material is selected from the group consisting of: an additive within said base sheet material, a coating on the surface of said base sheet material and an additive within ink used to print on the surface of said base sheet material.

4. The method of claim 1, wherein said photo-catalytic material is a nanoparticle metal oxide material.

5. The method of claim 1, wherein said photo-catalytic material is a nanoparticle semiconductor material.

6. The method of claim 1, wherein said photo-catalytic material is anatase $TiO_2$.

7. The method of claim 6, wherein said anatase $TiO_2$ is in nanoparticle form.

8. The method of claim 2, wherein said photo-catalysis is initiated using ultraviolet energy having a wavelength in the 200 nm-400 nm region.

9. The method of claim 3, wherein said photo-catalysis is initiated using ultraviolet energy having a wavelength in the 200 nm-400 nm region.

\* \* \* \* \*